United States Patent
Oomoto et al.

(10) Patent No.: US 8,918,021 B2
(45) Date of Patent: Dec. 23, 2014

(54) DAMPER DEVICE AND IMAGE FORMING APPARATUS

(75) Inventors: Noboru Oomoto, Toyokawa (JP);
Tadayasu Sekioka, Toyohashi (JP);
Yoshiyuki Toso, Toyokawa (JP);
Takashi Fujiwara, Hachioji (JP); Naoki Miyagawa, Toyokawa (JP)

(73) Assignee: Konica Minolta Business Technologies, Inc., Chiyoda-Ku Tokyo (JP)

( * ) Notice: Subject to any disclaimer, the term of this patent is extended or adjusted under 35 U.S.C. 154(b) by 220 days.

(21) Appl. No.: 13/483,623

(22) Filed: May 30, 2012

(65) Prior Publication Data
US 2012/0308267 A1 Dec. 6, 2012

(30) Foreign Application Priority Data
Jun. 1, 2011 (JP) .................................. 2011-123378

(51) Int. Cl.
*G03G 15/00* (2006.01)
*F16F 15/124* (2006.01)

(52) U.S. Cl.
CPC .......... *F16F 15/1245* (2013.01); *G03G 15/757* (2013.01)
USPC ....................................................... 399/167

(58) Field of Classification Search
CPC ..................................................... G03G 15/757
USPC ....................................................... 399/167
See application file for complete search history.

(56) References Cited

U.S. PATENT DOCUMENTS

| 5,213,879 A | 5/1993 | Niwa et al. |
| 5,420,664 A * | 5/1995 | Miwa et al. ..................... 399/167 |
| 5,881,342 A | 3/1999 | Makino et al. |
| 6,055,399 A * | 4/2000 | Omura ........................... 399/167 |

FOREIGN PATENT DOCUMENTS

| JP | H04-171336 A | 6/1992 |
| JP | H04-325232 A | 11/1992 |
| JP | 7-210032 A | 8/1995 |
| JP | 10-268602 A | 10/1998 |
| JP | 2000-098679 A | 4/2000 |
| JP | 2001-063303 A | 3/2001 |
| JP | 2002-174932 A | 6/2002 |
| JP | 2003-036007 A | 2/2003 |
| JP | 2005-249109 A | 9/2005 |

OTHER PUBLICATIONS

Office Action (Notification of Reasons for Refusal) issued Sep. 3, 2013, by the Japanese Patent Office in corresponding Japanese Patent Application No. 2011-123378, and an English Translation of the Office Action. (7 pages).

* cited by examiner

*Primary Examiner* — Sandra Brase
(74) *Attorney, Agent, or Firm* — Buchanan Ingersoll & Rooney PC (57) ABSTRACT

A damper device having: an input member into which a rotary drive force is inputted; a passive member which receives the rotary drive force inputted into the input member and rotates; a viscoelastic material which is provided between the input member and the passive member; and a flexible member which prevents displacement of the viscoelastic material in a diametrical direction while not preventing a shake of the viscoelastic material in a rotating direction.

20 Claims, 11 Drawing Sheets

DAMPER DEVICE AND IMAGE FORMING APPARATUS

This application is based on Japanese Patent Application No. 2011-123378 filed on Jun. 1, 2011, the content of which is incorporated herein by reference.

BACKGROUND OF THE INVENTION

1. Field of the Invention

The present invention relates to a damper device, especially to a damper device located in a place where an inputted force for rotary motion or linear motion is transmitted to a passive member, and an image forming apparatus such as a copier or a printer.

2. Description of Related Art

Generally, in an electrophotographic image forming apparatus, a rotary drive for an image forming process requires highly-accurate transmission of a rotative force. However, a rotary drive system includes factors of load fluctuations in a rotating direction or vibrations (speed fluctuations) in the rotating direction, such as a motor and engagements between gears, which inhibits an improvement in accuracy of the transmission of the rotative force. Meanwhile, simplification of the system for transmitting a rotative force has been demanded so as to reduce the cost, and for realizing this, vibrations (speed fluctuations) that occur upstream from the drive system need to be effectively blocked by a simple means so as not to be transmitted to downstream.

Japanese Patent Laid-Open Publication No. H7-210032 describes a drive system for rotating a photoreceptor drum. In the drive system, a side surface member with an elastically deformable inner peripheral part is attached to the end surface of the photoreceptor drum, and an engaging hole is made in the inner peripheral part to be engaged with an engaging pin of a driving gear. By the drive of the driving gear, the side surface member is elastically deformed. Then, by a reaction force of the deformation, the photoreceptor drum is rotated.

Japanese Patent Laid-Open Publication No. H10-268602 describes a drive system including a rotor, a drive source for driving the rotor, a first elastic member that transmits a rotative force from the drive source to the rotor and that determines the natural frequency of the drive system made up of the rotor and the drive source through its elastic deformation behavior, and a second elastic member that acts on the elastic behavior of the first elastic member so as to increase the damping characteristics.

Japanese Patent Laid-Open Publication No. 2002-174932 describes a drive system including a brushless motor that generates motive power, a photoreceptor drum that is driven to rotate by the motive power of the brushless motor, a gear train that transmits the motive power of the blushless motor to the photoreceptor drum through a plurality of gears, a rubber vibration isolator that is located between the gears so as to prevent transmission of vibrations to the photoreceptor drum, and a photoreceptor gear that is provided in the photoreceptor drum and connected to the gear.

The measures to isolate vibrations described in Japanese Patent Laid-Open Publication Nos. H7-210032, H10-268602 and 2002-174932 are not necessarily preferable in terms of simplification of the structure as well as effects, and a more effective measure to isolate vibrations has been desired.

SUMMARY OF THE INVENTION

According to a first aspect of the present invention, a damper device comprises: an input member into which a rotary drive force is inputted; a passive member which receives the rotary drive force inputted into the input member and rotates; a viscoelastic material which is provided between the input member and the passive member; and a flexible member which prevents displacement of the viscoelastic material in a diametrical direction while not preventing a shake of the viscoelastic material in a rotating direction.

According to a second aspect of the present invention, a damper device, comprises: an input member into which a rotary drive force is inputted; a passive member which receives the rotary drive force inputted into the input member and rotates; a viscoelastic material which is provided between the input member and the passive member; and a cylindrical inner wall which prevents displacement of the viscoelastic material in a diametrical direction while not preventing a shake of the viscoelastic material in a rotating direction.

According to a third aspect of the present invention, an image forming apparatus comprises: an image forming section for forming an image on a recording medium; a damper device to be employed in a rotary drive mechanism for the image forming unit, the damper device comprising: an input member into which a rotary drive force is inputted; a passive member which receives the rotary drive force inputted into the input member and rotates; a viscoelastic material which is provided between the input member and the passive member; and a flexible member which prevents displacement of the viscoelastic material in a diametrical direction while not preventing a shake of the viscoelastic material in a rotating direction.

According to a fourth aspect of the present invention, an image forming apparatus comprises: an image forming section for forming an image on a recording medium; a damper device to be employed in a rotary drive mechanism for the image forming section, the damper device comprising: an input member into which a rotary drive force is inputted; a passive member which receives the rotary drive force inputted into the input member and rotates; a viscoelastic material which is provided between the input member and the passive member; and a cylindrical inner wall which prevents displacement of the viscoelastic material in a diametrical direction while not preventing a shake of the viscoelastic material in a rotating direction.

BRIEF DESCRIPTION OF DRAWINGS

These and other features of the present invention will be apparent from the following description with reference to the accompanying drawings, in which.

DETAILED DESCRIPTION OF THE PREFERRED EMBODIMENTS

Hereinafter, damper devices and image forming apparatuses according to preferred embodiments of the present invention will be described with reference to the drawings. It should be noted that in each of the drawings, the same member or portion is provided with a common reference symbol, and a description thereof will not be repeated.

General Structure of Image Forming Apparatus; See FIG. 1

Figure 1:
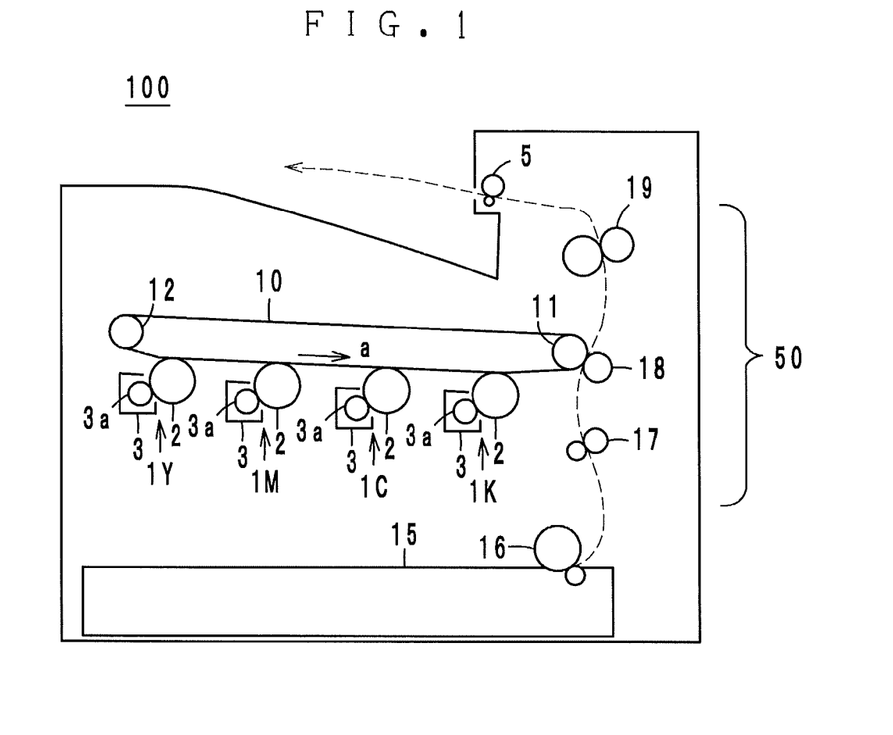
FIG. 1 is a schematic constitutional view showing an image forming apparatus.

As shown in FIG. 1, the image forming apparatus 100 is configured as a color printer of a tandem type. The image forming apparatus 100 has an image forming section 50 of a structure described below, and the image forming section 50 forms a color image on a recording medium. In the image forming section 50, image forming units 1Y, 1M, 1C and 1K for forming images of Y (yellow), M (magenta), C (cyan) and K (black) are arranged in parallel immediately below an intermediate transfer belt 10. Each of the image forming units 1Y, 1M, 1C and 1K has a known configuration where a development device 3 and other devices are arranged with a photoreceptor drum 2 at the center. The intermediate transfer belt 10 is extended in an endless state between support rollers 11 and 12, and is driven rotate in a direction shown by arrow a. Toner images formed on the respective photoreceptor drums 2 are transferred on the intermediate transfer belt 10 sequentially (primary transfer) to be synthesized into a color image.

Sheets of paper (recording medium) are loaded in a paper feeding tray 15 and fed one by one by a paper feeding roller 16. Then, the fed sheet passes through a nip part between the intermediate transfer belt 10 and a secondary transfer roller 18 via a timing roller pair 17 so that the color image can be transferred from the intermediate transfer belt 10 onto the sheet. Thereafter, the sheet is carried to a fixation unit 19, where the toner image is fixed on the sheet by heat, and then is ejected to the upper surface of the body through an ejection roller pair 5.

It is to be noted that the image forming apparatus is not necessarily a color printer as described above and may be a black-and-white printer. Also, the image forming apparatus may be selected from various types, such as a type of copiers provided with an image reading unit and a type of apparatuses provided with a facsimile function and/or a communication function with the Internet.

A damper device according to the present invention can be employed in a rotary drive mechanism for the image forming section 50.

Basic Embodiment of Damper Device; See FIG. 2

A basic embodiment of the damper device will be described with reference to FIG. 2. Basically, the damper device 20 includes: an input member 21 into which a rotary drive force in a direction shown by arrow b is inputted; a passive member 25 that receives the rotary drive force inputted into the input member 21 and rotates in the direction shown by arrow b; a viscoelastic material 30 that is provided between the input member 21 and the passive member 25; and a flexible film 35 for preventing displacement of the viscoelastic material 30 in the diametrical direction while not preventing shakes of the viscoelastic material 30 in the rotating direction. Assuming a circle of which center is the axis of rotation of the input member 21 or the passive member 25, the circumferential direction of the circle is referred to as a "rotating direction", and the vertical direction to the axis of rotation is referred to as a "diametrical direction".

Figure 2:
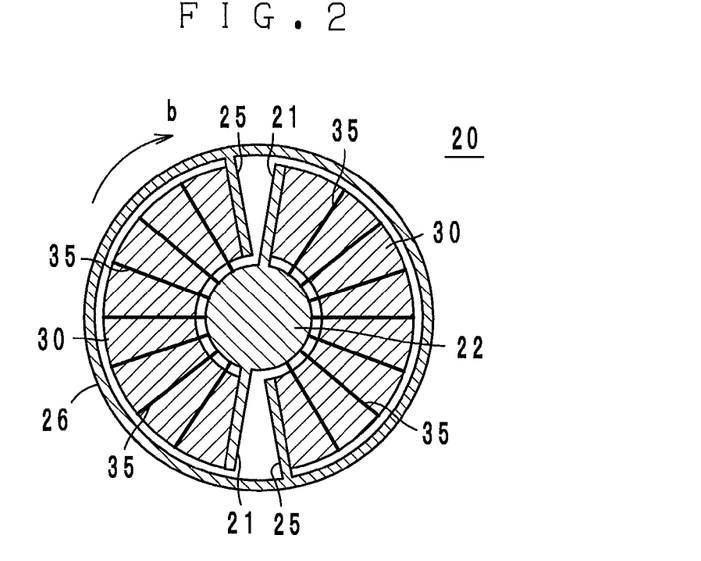
FIG. 2 is a sectional view showing a basic embodiment of the damper device.

In the case of FIG. 2, two input members 21 are provided on an outer peripheral surface of a shaft 22 at an interval of 180°. Two passive members 25 are provided on an inner peripheral surface of a tubular member 26 at an interval of 180°. The viscoelastic material 30 is formed in the shape of substantially a circular cylinder or an arc-like cylinder. The viscoelastic material 30 is arranged with a slight space from the shaft 22 and with a slight space from the tubular member 26. In the case of FIG. 2, the viscoelastic material 30 is divided into two parts, and the two parts are arranged in the right side and the left side, respectively. Each part of the viscoelastic material 30 ranges about 160 degrees. The both end surfaces of the respective parts of the viscoelastic material 30 in the rotating direction are bonded or simply cramped (in a non-bonded state) to the input members 21 and the passive members 25. Each of the parts of the viscoelastic material 30 arranged in the two areas is further divided into eight segments. The films 35 are inserted among the eight segments and bonded to the cutoff surfaces of the segments. That is, a film 35 is bonded to each segment, thereby preventing each segment from being displaced (expanding) in the diametrical direction. Meanwhile, the film 35 does not prevent each segment of the viscoelastic material 30 from shaking (contracting) in the rotating direction.

In the damper device 20 of the structure above, when each of the input members 21 receives an input of a rotary drive force in the direction shown by arrow b, the rotary drive force is transmitted to the passive member 25 via the eight segments and the seven films 35. The viscoelastic material 30 compresses and expands in the rotating direction in accordance with rotation vibrations inputted simultaneously with the rotary drive force to convert vibration energy to thermal energy, thereby damping the rotation vibrations.

Examples of Division of Viscoelastic Material; See FIG. 3

Figure 3:
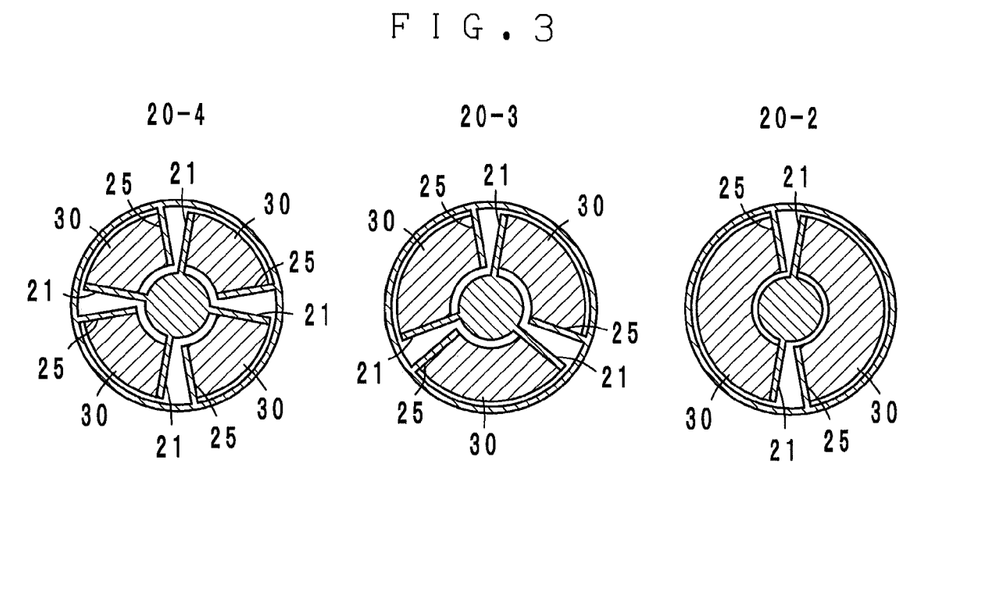
FIG. 3 is an explanatory view showing division models of a viscoelastic material.

As for the division of the viscoelastic material, as shown in FIG. 3, there can be assumed a four-division model 20-4 wherein a circular cylindrical viscoelastic material is divided equally into four, a three-division model 20-3 wherein a circular cylindrical viscoelastic material is divided equally into three, and a two-division model 20-2 wherein a circular cylindrical viscoelastic material is divided equally into two. Although these models are almost the same in the total amount of viscoelastic material 30, these models have different torsion spring properties in the rotary drive direction. When the four-division model 20-4 is compared with the two-division model 20-2, each division of the viscoelastic material in the four-division model 20-4 has a circumferential length that is a half of that in the two-division model 20-2. The total area of the transmission surfaces for transmitting the rotary drive force in the four-division model 20-4 is twice as large as that in the two-division model 20-2. This means that in the case of considering a model of a simple linear spring, the spring constant of the four-division model 20-4 is four times as large as that of the two-division model 20-2.

Response to Vibration Transmission; See FIGS. 4 to 6

Figure 4:
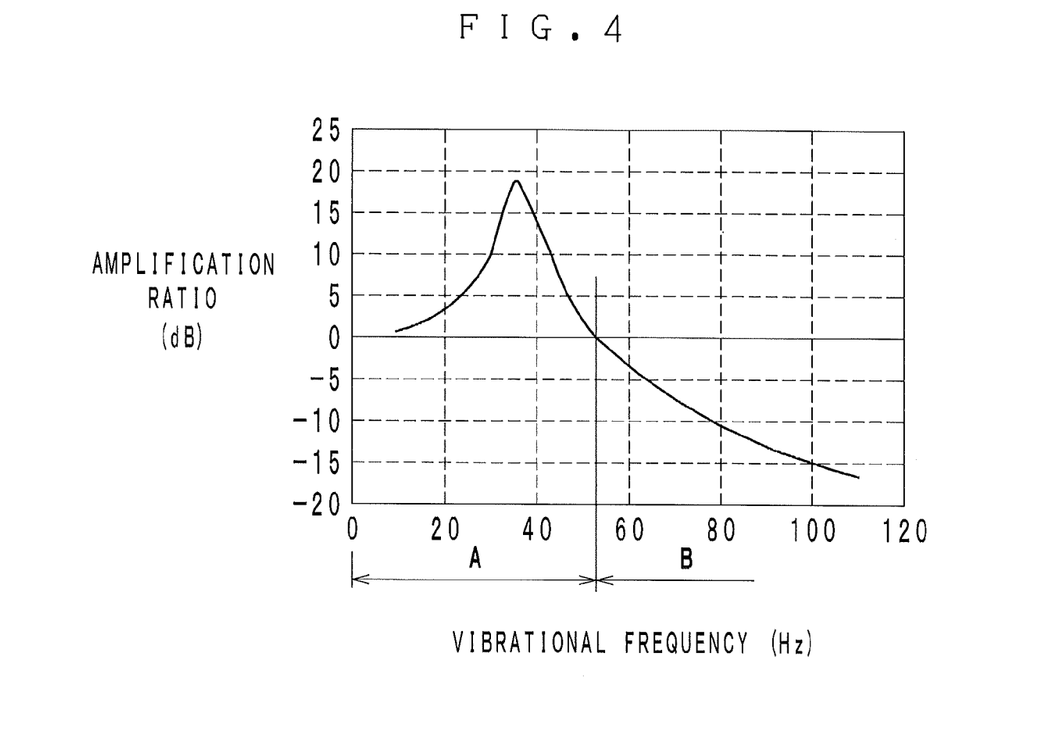
FIG. 4 is a graph showing an amplification ratio characteristic based on elasticity.
Figure 5:
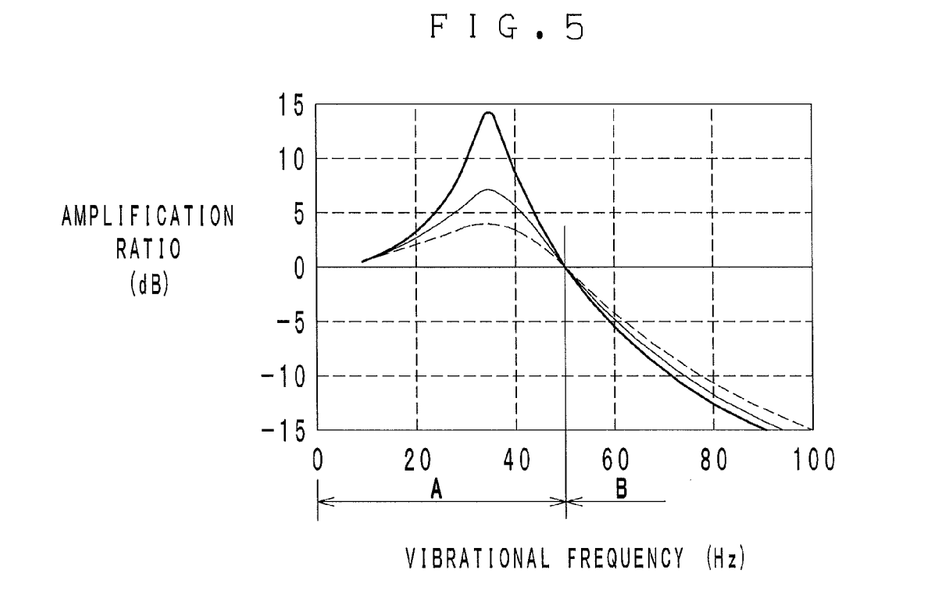
FIG. 5 is a graph showing an amplification ratio characteristic based on viscosity.
Figure 6:
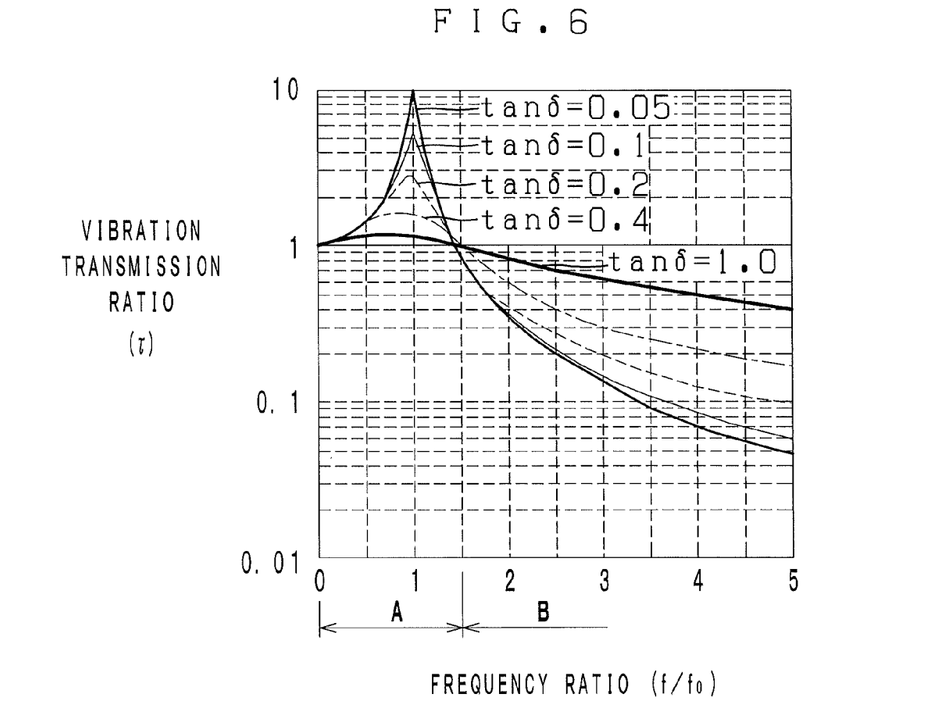
FIG. 6 is a graph showing a vibration transmission ratio characteristic based on viscosity.

Vibration transmission can be expressed as response functions shown in FIGS. 4 to 6. FIG. 4 shows an amplification ratio characteristic based on elasticity, and FIG. 5 shows an amplification ratio characteristic based on viscosity. Further, FIG. 6 shows a vibration transmission characteristic based on viscosity. Each of these graphs is divided into an area A where vibrations are amplified and an area B where vibrations are damped with the boundary defined by a point at which the amplitude of an output is almost equal to the amplitude of an input. Suppression of vibration transmission can be achieved in the areas where negative amplification ratios can be obtained or the area where vibration transmission ratios less than 1 can be obtained. As one measure to suppress the vibration transmission in a low-frequency region, it is effective to totally move the amplification ratio characteristic curve leftward. In order to realize this, the peak of the characteristic curve (resonance point) shall be moved leftward, that is, the resonance frequency shall be set lower.

The resonance frequency $f_0$ is shown by the following expression (1). The central formula in the expression (1), wherein k denotes a spring constant and M denotes an inertia mass, expresses the resonance frequency in cases of linear vibrations. The right formula, wherein K denotes torsional spring rigidity and I denotes an inertia moment, expresses the resonance frequency in cases of rotation vibrations.

$$f_0 = \frac{1}{2\pi}\sqrt{\frac{k}{M}} = \frac{1}{2\pi}\sqrt{\frac{K}{I}} \quad (1)$$

As is obvious from the expression (1), in order to lower the resonance frequency, the torsional spring rigidity K may be reduced, or the inertia moment I may be increased. When the four-division model and the two-division model shown in FIG. 3 are compared with each other, the two-division model has smaller torsional spring rigidity, and accordingly, the resonance frequency of the two-division model can be lowered readily. Therefore, in the two-division model, the vibration transmission can be suppressed in a high-frequency region as well as a low-frequency region.

FIG. 6 shows the relation between vibration transmission ratio τ and frequency ratio $f/f_0$, and the vibration transmission ratio is shown by the following expression (2). Here, $F_0$ denotes an excitation force generated by a vibratory source, F denotes a transmitted force transmitted to a vibrated body, f denotes a requency generated by the vibratory source, $f_0$ denotes a natural frequency with a vibration-proof support, and tan δ denotes a loss coefficient.

$$\tau = \frac{F}{F_0} = \sqrt{\frac{1 + (\tan\delta)^2}{\left[1 - \left(\frac{f}{f_0}\right)^2\right]^2 + (\tan\delta)^2}} \quad (2)$$

Considering vibration transmission based on the viscosity as shown in FIGS. 5 and 6, a material with high viscosity (with a large loss coefficient) should be used so as to suppress vibrations in the vicinity of the resonance point. In order to suppress vibrations in a damping area, a material with low viscosity (with a small loss coefficient) should be used.

The considerations above show that it is possible to lower the spring properties of the viscoelastic material 30 by appropriately setting the properties (elasticity, viscosity) of the viscoelastic material 30 itself, other than the method of lowering torsional spring rigidity by dividing the viscoelastic material 30. Table 1 below shows elasticity and viscosity of materials A to E which can be used as the viscoelastic material 30 in the present damper device. The materials A, B and C have low elasticity, and the material D has slightly high elasticity and a middle level of viscosity. The material E has very high viscosity.

TABLE 1

|  | Elasticity Young's Modulus E MPa | Viscosity tan δ |
| --- | --- | --- |
| Material A | 0.68 | 0.07 |
| Material B | 1.54 | 0.09 |
| Material C | 3.98 | 0.07 |
| Material D | 14.67 | 0.33 |
| Material E | 18.05 | 1.08 |

Analytical Models of Damper Device; See FIGS. 7 to 10

Figure 7:
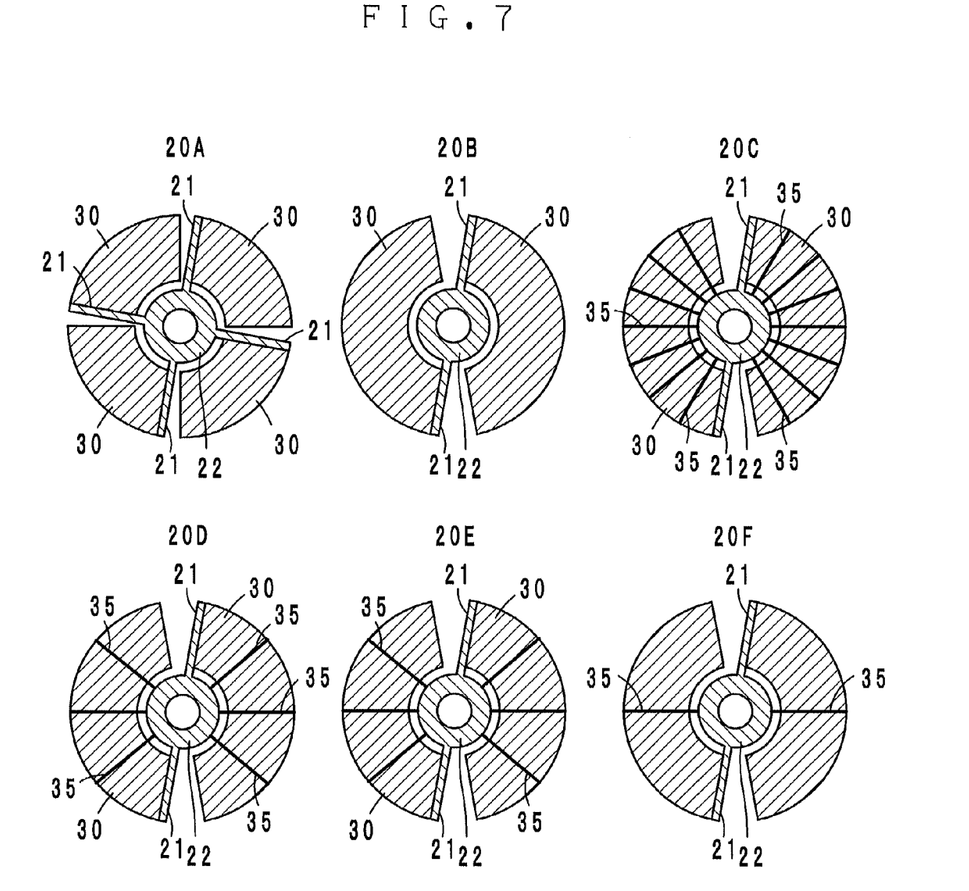
FIG. 7 is an explanatory view showing analytical models of the damper device.

FIG. 7 shows analytical models of the present damper device. In a model 20A, the viscoelastic material 30 is simply divided into four. In a model 20B, the viscoelastic material 30 is simply divided into two. In a model 20C, the viscoelastic material 30 is divided into two parts, and each of the two parts is further divided into eight segments. In each of the two parts, the films 35 are arranged among the eight segments (seven films 35 are arranged at seven places) with both surfaces of each film bonded to the segments adjacent thereto. The base ends of the films 35 are fixed to the shaft 22 of the input member 21. In a model 20D, the viscoelastic material 30 is divided into two parts, and each of the two parts is further divided into four segments. Then, the films 35 are arranged among the four segments (three films 35 are arranged at three places) with both surfaces of each film bonded to the segments adjacent thereto. The base ends of the films 35 are fixed to the shaft 22 of the input member 21.

In a model 20E, the viscoelastic material 30 is divided into two parts, and each of the two parts is further divided into four segments. Then, the films 35 are arranged among the four segments (three films are arranged at three places) with only one surface of each segment bonded to the segment adjacent thereto. The base ends of the films 35 are fixed to the shaft 22 of the input member 21. In a model 20F, the viscoelastic material 30 is divided into two parts, and each of the two parts is further divided into two segments. Then, the film 35 is arranged between the two segments with both surfaces thereof bonded to the segments. The base end of the film 35 is fixed to the shaft 22 of the input member 21.

Figure 8:
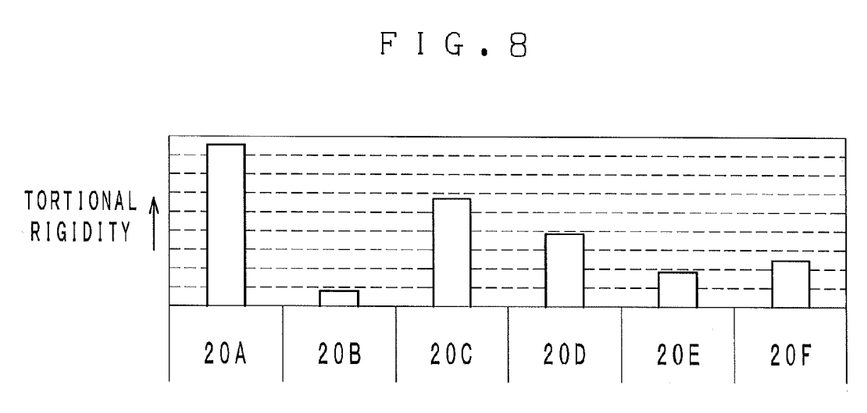
FIG. 8 is a chart showing analysis results regarding torsional rigidity.
Figure 9:
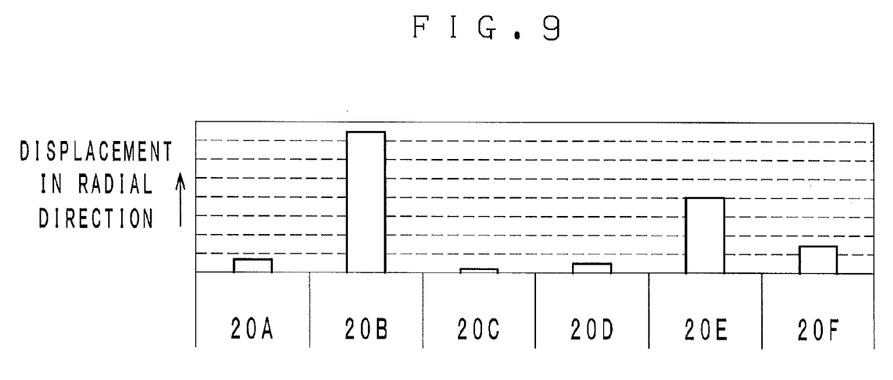
FIG. 9 is a chart showing analysis results regarding displacement in a radial direction.
Figure 10:
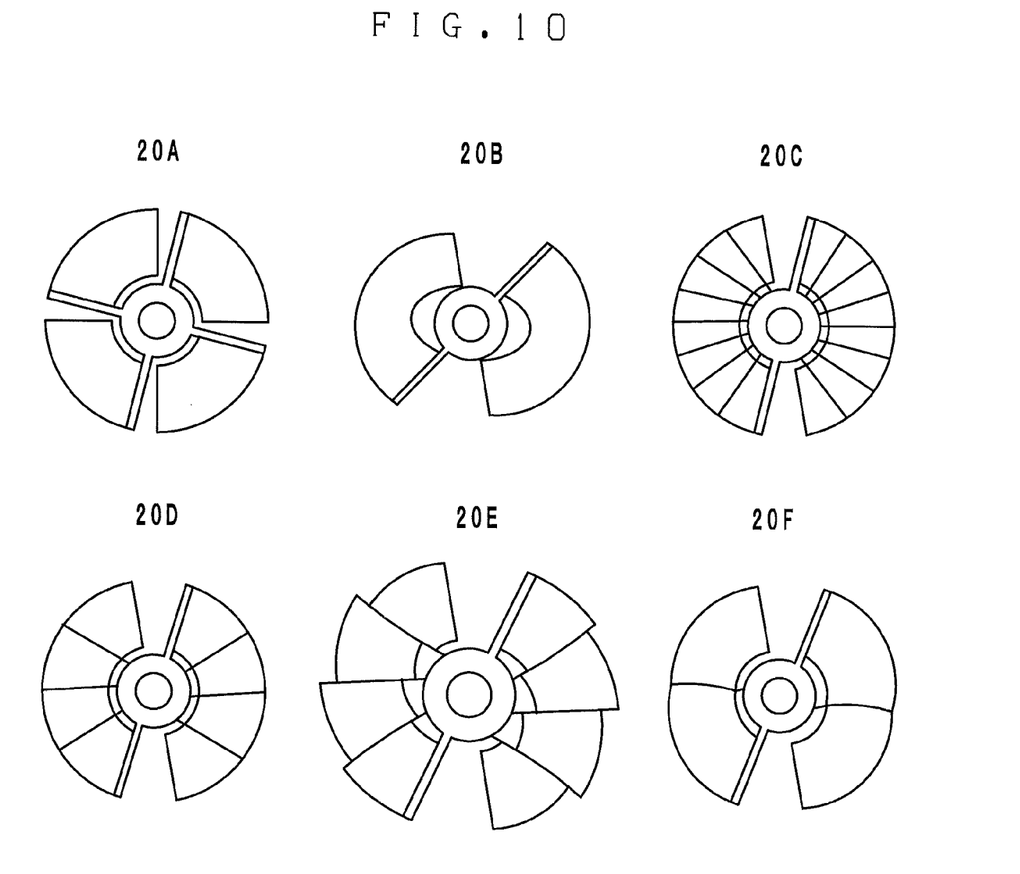
FIG. 10 is a chart showing analysis results regarding deformation of the viscoelastic material.

FIGS. 8 to 10 show analysis results of the above eight kinds of models. First, the analysis results of the models 20A and 20B with no films 35 are studied. The model 20B, which is the two-division type, has torsional rigidity not more than one tenth as large as that of the model 20A, which is the four-division type (see FIG. 8), and thus, the model 20B seems to have desirable performance. However, displacement in the radial direction of the model 20B is equal to or greater than ten times as large as that of the model 20A (see FIG. 9). Thus, the viscoelastic material 30 of the model 20B is deformed to a great degree as shown in FIG. 10, and in anticipation of this deformation, the two-division model 20B necessitates a large accommodation space for the viscoelastic material 30. Also, due to the deformation, the model 20B has unstable vibration suppressing performance and has a problem of a significantly short life of the viscoelastic material 30.

The analysis results of the models 20C to 20F with the films 35 are studied. The models 20C to 20F have small torsional rigidity and high low-frequency vibration suppressing performance as compared with the simple four-division model 20A (see FIG. 8). Further, regarding displacement in the radial direction, the models 20C to 20F have small displacement as compared with the simple two-division model 20B (see FIG. 9).

Next, the models 20D and 20E, each of which has three films 35, are compared with each other. The model 20E, in which only one surface of each film 35 is bonded to the segment adjacent thereto, has smaller torsional rigidity and larger displacement in the radial direction than the model 20D. Therefore, the models 20D and 20E may be properly used in accordance with the place where the damper device is actually used.

First Example of Damper Device; See FIG. 11

Figure 11:
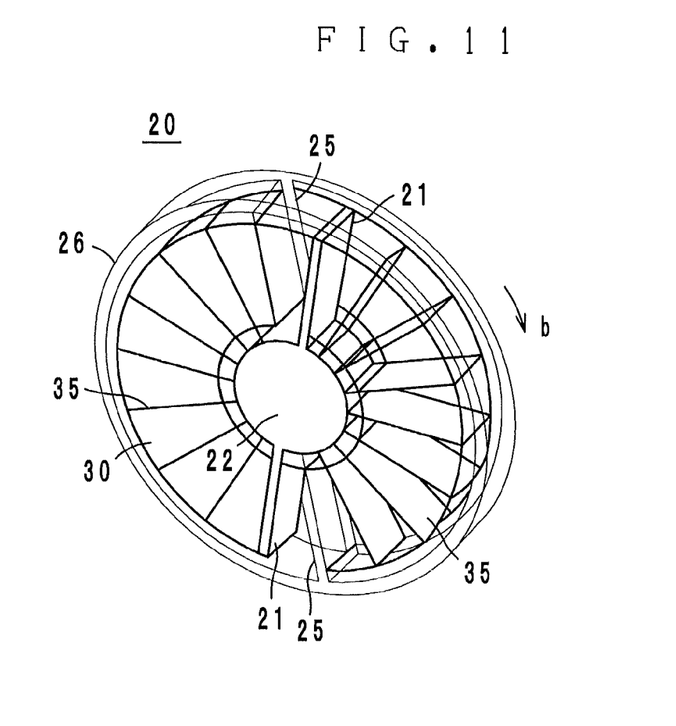
FIG. 11 is a perspective view showing a first example of the damper device.

A first example of the damper device 20 corresponds to the basic embodiment shown in FIG. 2. In the first example, the films 35 may be bonded and fixed to the shaft 22 of the input members 21 or alternatively may be integrally molded with the shaft 22.

Second Example of Damper Device; See FIG. 12

Figure 12:
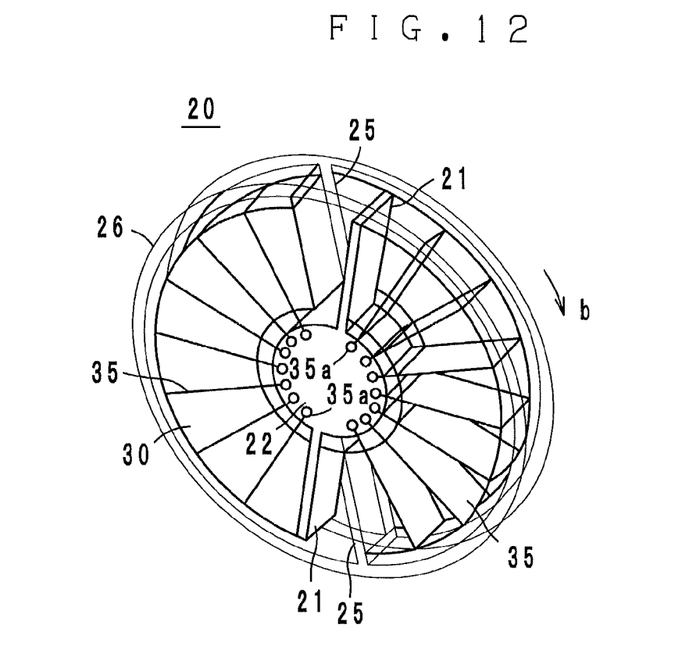
FIG. 12 is a perspective view showing a second example of the damper device.

In a second example of the damper device 20, a pivot 35a is provided at the base end of each film 35. The pivots 35a of the films 35 are inserted into grooves formed in the shaft 22 of the input members 21. Each of the films 35 turns on the base end (pivot 35a), and thereby, the second example has an improved vibration damping effect.

Third Example of Damper Device; See FIG. 13

Figure 13:
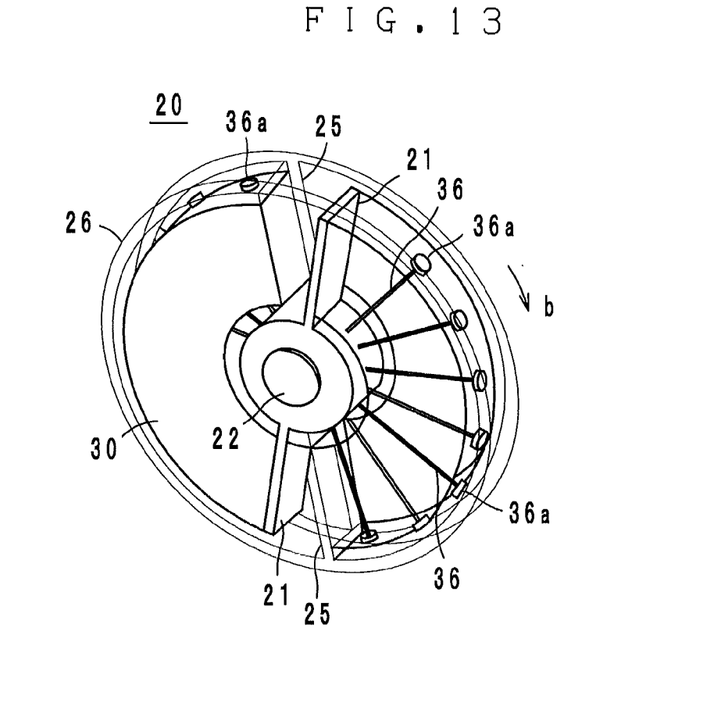
FIG. 13 is a perspective view showing a third example of the damper device.

A third example of the damper device 20 has strings 36 in place of the films 35. The base ends of the strings 36 are fixed to the shaft 22 of the input members 21, and the strings 36 penetrate through the viscoelastic material 30. Then, protruding tips 36a of the strings 36 hold the outer peripheral surface of the viscoelastic material 30 so as to suppress displacement of the viscoelastic material 30 in the diametrical direction. Although a molded article made of resin is used as the strings 36 in the third example, it is to be noted that various materials can be used for the strings 36.

Fourth Example of Damper Device; See FIG. 14

Figure 14:
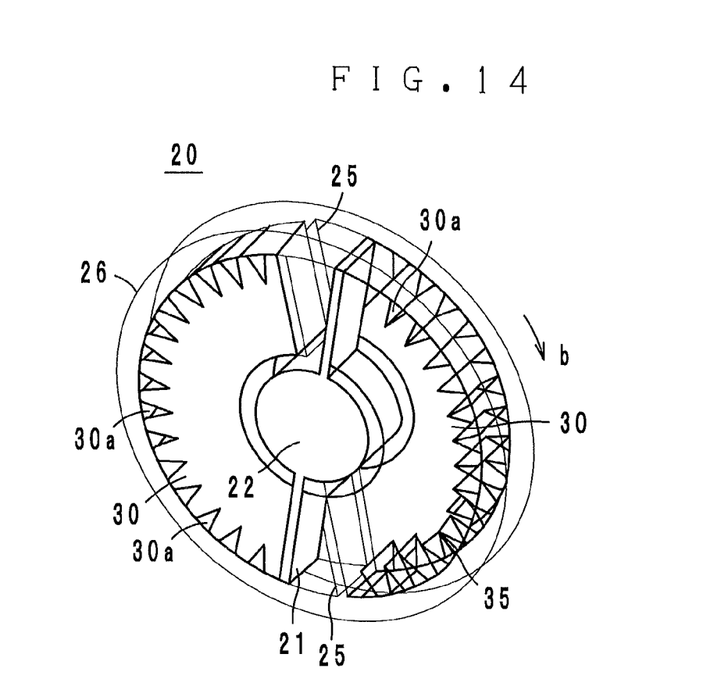
FIG. 14 is the perspective view showing a fourth example of the damper device.

In a fourth example of the damper device 20, the viscoelastic material 30 is divided into two parts, and a plurality of cutouts 30a that are triangular in cross-section are formed on the outer peripheral surfaces of the two parts of the viscoelastic material 30. One end surface of each part of the viscoelastic material 30 is bonded or simply cramped to the input member 21, and the other end surface thereof is bonded or simply cramped to the passive member 25. The tubular member 26 is integrally formed with the passive members 25, and the inner diameter of the tubular member 26 is almost equal to the outer diameter of the viscoelastic material 30.

The fourth example is similar to the first to third examples in that the viscoelastic material 30 is caused to contract and expand by the rotary drive force inputted into the input member 21, thereby damping vibrations. Especially in the fourth example, the inner wall of the tubular member 26 suppresses displacement (expansion) of the viscoelastic material 30 in the diametrical direction. In order to keep a certain degree of freedom of shakes (contraction/expansion) of the viscoelastic material 30 in the circumferential direction, it is preferable to previously apply a lubricant (e.g., grease) on the inner wall of the tubular member 26 so as to reduce a frictional force between the inner wall and the outer peripheral surface of the viscoelastic material 30. Further, the cutouts 30a are formed for the purpose of not inhibiting deformation of the viscoelastic material 30 in the rotating direction.

Drive Mechanism Provided with Damper Device; See FIGS. 15 and 16

Figure 15:
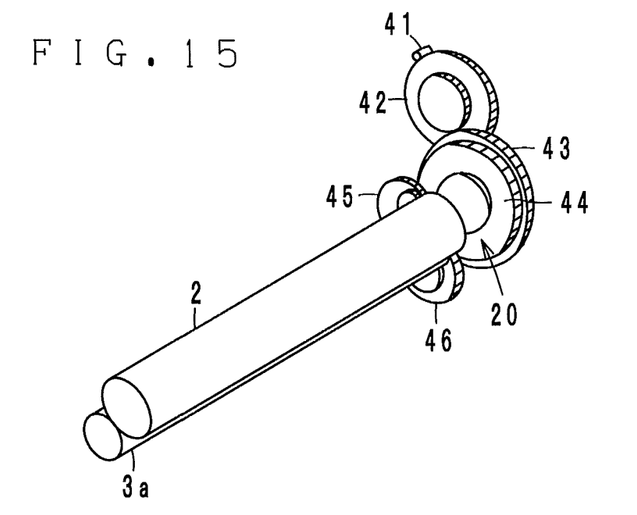
FIG. 15 is a perspective view showing a drive mechanism provided with the damper device.
Figure 16:
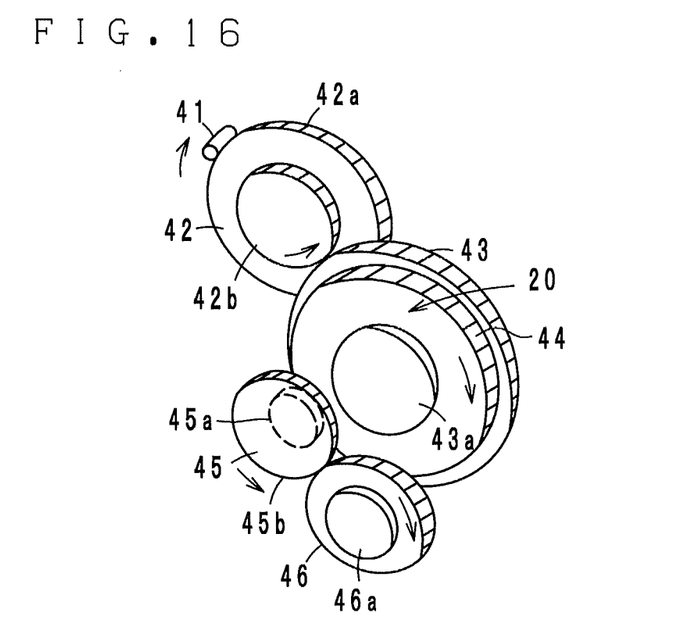
FIG. 16 is a perspective view showing a main part of the drive mechanism shown in FIG. 15.

FIGS. 15 and 16 each show a drive mechanism provided with the damper device 20, and this drive mechanism is to drive an image forming unit (photoreceptor drum 2, development roller 3a of development unit 3) of the color printer shown in FIG. 1. In the color printer, further, the damper device 20 can be favorably used in a drive mechanism for the roller 11 that drives the intermediate transfer belt 10.

The photoreceptor drum 2 and the development roller 3a are arranged with a slight space therebetween, and an output gear wheel 41 of a motor (not shown) engages with a large-diameter wheel 42a of a gear wheel 42, and a small-diameter wheel 42b of the gear wheel 42 is engaged with a gear wheel 43. A member 44 fixed to the gear wheel 43 transmits a rotary drive force to the photoreceptor drum 2. Further, the gear wheel 43 is engaged with a small-diameter wheel 45a of a gear wheel 45, and a large-diameter wheel 45b of the gear wheel 45 is engaged with a gear wheel 46. A shaft 46a that is integrally provided with the gear wheel 46 transmits a rotary drive force to the development roller 3a. The gear wheel 43 is integrally formed with its shaft 43a. Further, rotating directions of the respective members are indicated by arrows in FIG. 16.

In the drive mechanism made up of the above components, the damper device 20 is fixed between the shaft 43a and the member 44. For example, when the damper device 20 of the first example (see FIG. 11) is used, the shaft 43a serves as the shaft 22, and the member 44 serves as the tubular member 26. The viscoelastic material 30 is placed between the shaft 43a and the member 44. The rotary drive force is transmitted through the gear wheels 41, 42, 43, 45 and 46 in this order. Meanwhile, microvibrations that are possibly included in the rotary drive force transmitted to the gear wheel 43 from the upstream side are damped in the damper device 20, and thereby, are not transmitted to the downstream side where the photoreceptor drum 2 and the development roller 3*a* are arranged.

Fifth Example of Damper Device; Dee FIGS. 17 to 19

Figure 17:
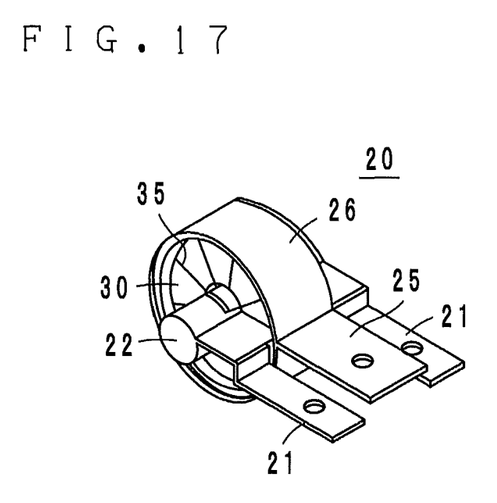
FIG. 17 is a perspective view showing a fifth example of the damper device.
Figure 18:
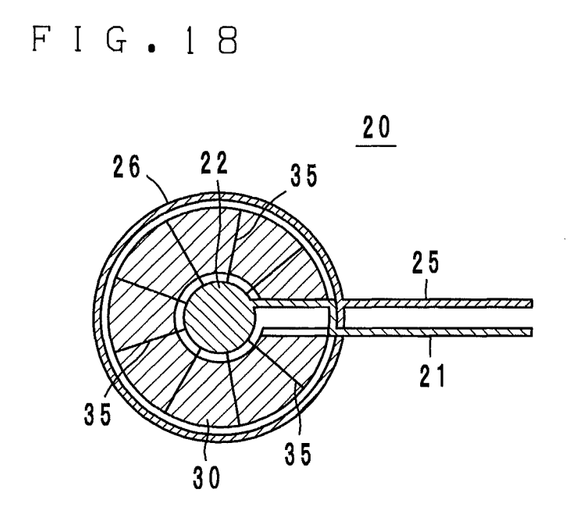
FIG. 18 is a front view of the damper device shown in FIG. 17.

A fifth example of the damper device 20 is used as a means for buffering linear vibrations. That is, as shown in FIGS. 17 and 18, a plate-like input member 21 and a plate-like passive member 25 are opposed to each other. The input member 21 is connected to the shaft 22, and the passive member 25 is connected to the tubular member 26, and the viscoelastic material 30 is arranged between the input member 21 and the passive member 25. The viscoelastic material 30 is divided into nine segments, and films 35 are arranged among the nine segments, and the films 35 are bonded or simply cramped among the segments.

Figure 19:
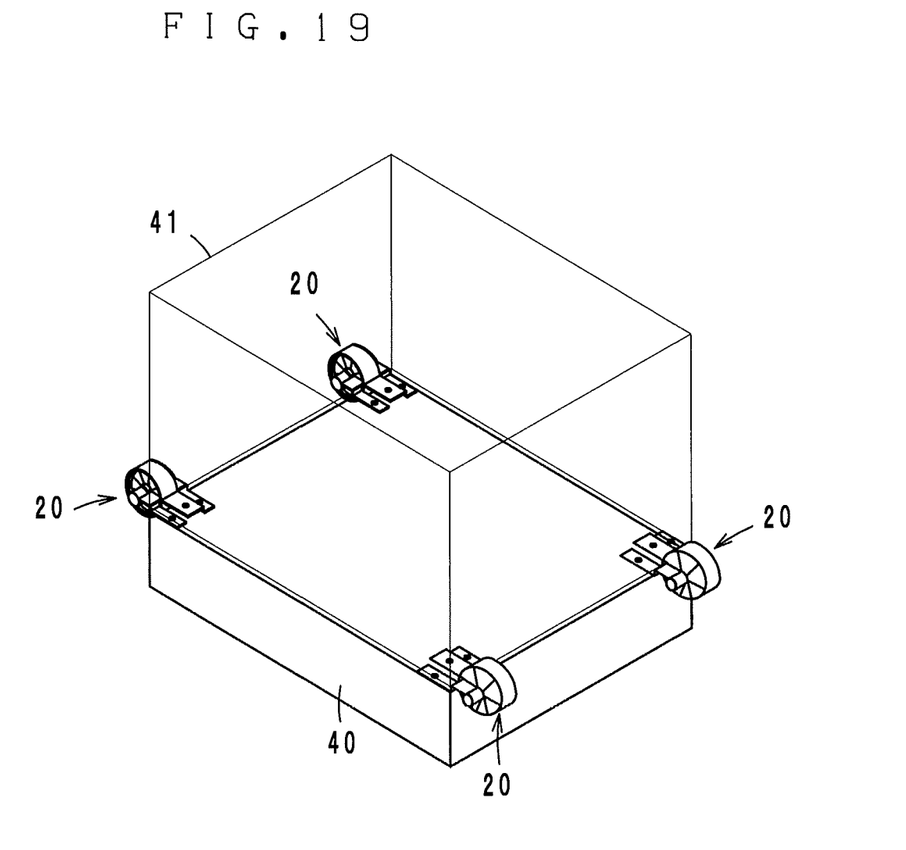
FIG. 19 is a perspective view showing a buffer mechanism provided with the damper device shown in FIG. 17.

As shown in FIG. 19, damper devices 20 of this type are placed between a base 40 and, for example, a measuring instrument 41 that shall be free from microvibrations. More specifically, the input members of four damper devices 20 are fixed to four corners of the upper surface of the base 40 respectively, and the measuring instrument 41 is mounted on the passive members 25. Therefore, even when microvibrations occur in the base 40, the microvibrations are damped by the damper devices 20 and are not transmitted to the measuring instrument 41. It is to be noted that the instrument mounted on the base 40 is not necessarily a measuring instrument.

Although the present invention has been described in connection with the preferred embodiment above, it is to be noted that various changes and modifications are possible to those who are skilled in the art. Such changes and modifications are to be understood as being within the scope of the present invention.

What is claimed is:

1. A damper device, comprising:
   an input member into which a rotary drive force is inputted;
   a passive member which receives the rotary drive force inputted into the input member and rotates;
   a viscoelastic material which is provided between the input member and the passive member; and
   a flexible member which prevents displacement of the viscoelastic material in a diametrical direction while not preventing a shake of the viscoelastic material in a rotating direction.

2. The damper device according to claim 1, wherein
   the viscoelastic material is divided into a plurality of segments in a rotating direction,
   the flexible member is a film, and
   each of the segments of the viscoelastic material is bonded to or supported by the film.

3. The damper device according to claim 2, wherein a surface of each of the segments of the viscoelastic material, which is a leading or a trailing surface in the rotating direction, is bonded to the film.

4. The damper device according to claim 2, wherein both surfaces of each of the segments of the viscoelastic material, which are leading and trailing surfaces in the rotating direction, are bonded to the film.

5. The damper device according to claim 1, wherein
   the flexible member is a string, and
   the string penetrates through the viscoelastic material in the diametrical direction.

6. The damper device according to claim 1, wherein the input member and the passive member are opposed to each other.

7. The damper device according to claim 1, wherein the input member comprises a center shaft and at least one portion protruding outwardly from the center shaft in the diametrical direction.

8. The damper device according to claim 1, wherein the passive member comprises at least one portion protruding inwardly from a circumferential periphery of the passive member in the diametrical direction.

9. The damper device according to claim 1, wherein the viscoelastic material comprises a arced shape.

10. The damper device according to claim 1, wherein the viscoelastic material comprises at least two segments that are physically separated from each other.

11. A damper device, comprising:
    an input member into which a rotary drive force is inputted;
    a passive member which receives the rotary drive force inputted into the input member and rotates;
    a viscoelastic material which is provided between the input member and the passive member; and
    a cylindrical inner wall which prevents displacement of the viscoelastic material in a diametrical direction while not preventing a shake of the viscoelastic material in a rotating direction.

12. The damper device according to claim 11, wherein the input member and the passive member are opposed to each other.

13. An image forming apparatus comprising:
    an image forming section for forming an image on a recording medium;
    a damper device to be employed in a rotary drive mechanism for the image forming section, the damper device comprising:
    an input member into which a rotary drive force is inputted;
    a passive member which receives the rotary drive force inputted into the input member and rotates;
    a viscoelastic material which is provided between the input member and the passive member; and
    a flexible member which prevents displacement of the viscoelastic material in a diametrical direction while not preventing a shake of the viscoelastic material in a rotating direction.

14. The image forming apparatus according to claim 13, wherein:
    the viscoelastic material is divided into a plurality of segments in a rotating direction;
    the flexible member is a film; and
    each of the segments of the viscoelastic material is bonded to or supported by the film.

15. The image forming apparatus according to claim 14, wherein a surface of each of the segments of the viscoelastic material, which is a leading or a trailing surface in the rotating direction, is bonded to the film.

16. The image forming apparatus according to claim 14, wherein both surfaces of each of the segments of the viscoelastic material, which are leading and trailing surfaces in the rotating direction, are bonded to the film.

17. The image forming apparatus according to claim 13, wherein:
    the flexible member is a string; and
    the string penetrates through the viscoelastic material in the diametrical direction.

18. The image forming apparatus according to claim 13, wherein the input member and the passive member are opposed to each other.

19. An image forming apparatus comprising:
- an image forming section for forming an image on a recording medium;
- a damper device to be employed in a rotary drive mechanism for the image forming section, the damper device comprising:
  - an input member into which a rotary drive force is inputted;
  - a passive member which receives the rotary drive force inputted into the input member and rotates;
  - a viscoelastic material which is provided between the input member and the passive member; and
  - a cylindrical inner wall which prevents displacement of the viscoelastic material in a diametrical direction while not preventing a shake of the viscoelastic material in a rotating direction.

20. The image forming apparatus according to claim 19, wherein the input member and the passive member are opposed to each other.

* * * * *